OXIDE-TYPE VARACTOR WITH INCREASED CAPACITANCE RANGE

Filed July 13, 1966

INVENTOR
BARRY J. LILES
BY James and Franklin
ATTORNEY

United States Patent Office 3,508,123

Patented Apr. 21, 1970

3,508,123

OXIDE-TYPE VARACTOR WITH INCREASED CAPACITANCE RANGE

Barry J. Liles, Jackson Heights, N.Y., assignor to General Instrument Corporation, Newark, N.J., a corporation of New Jersey Filed July 13, 1966, Ser. No. 564,937
Int. Cl. H01l 3/00
U.S. Cl. 317—234 10 Claims

ABSTRACT OF THE DISCLOSURE

In an oxide-type varactor, in which a dielectric layer is interposed between a first electrode and a semiconductor body of first conductivity type, the construction being such that the capacitance between the electrode and the semiconductor body is appreciable and is controllably variable with change in the bias applied to the device, the range over which the capacitance can be varied with change in bias is appreciably increased by providing in the semiconductor body beneath the electrode a small area of second conductivity type to which the electrode is electrically connected, a junction being defined between the two areas of opposite conductivity type.

Figure 1:
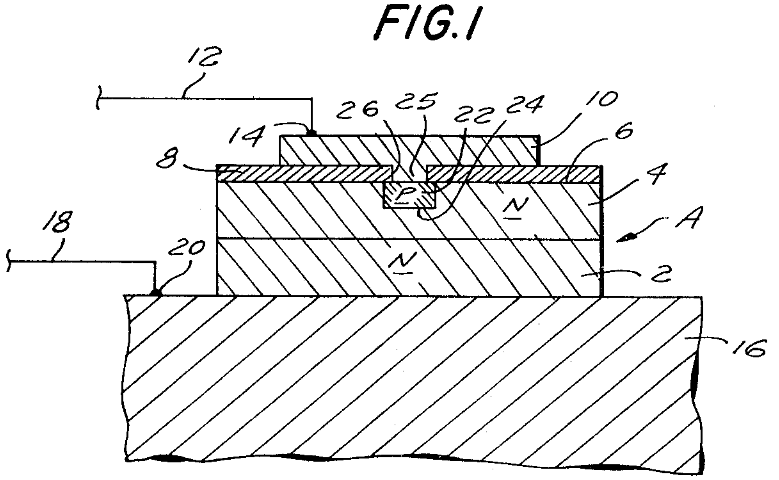

The present invention relates to a novel construction for an oxide-type varactor, by means of which the range over which the capacitance of the device can be varied is greatly extended.

A varactor is a semiconductor device having a pair of electrodes between which a capacitance is established, and in which the capacitance of the device can be varied by varying the voltage bias applied to the device. In one type of varactor, to which the present invention relates, the capacitance is defined between a semiconductor body and an electrode of appreciable area which is disposed close to but insulated from a surface of that body. The term "oxide type" is often applied to this kind of varactor because the insulating layer between the semiconductor body and the electrode of appreciable area is generally constituted by an oxide, usually silicon dioxide when the semiconductor body is formed of silicon. However, it is not essential that the dielectric layer between the semiconductor body and the extended area electrode be an oxide; it can be any appropriate dielectric material which is compatible witth the material of which the semiconductor body is formed—it should not dope or contaminate the conductor body and it should have a surface potential characteristic, relative to the semiconductor body, which does not interfere with the existence of an effective capacitance between the semiconductor body and the extended area electrode. The term "oxide type" is here used generically, and without regard to the specific composition of the dielectric layer.

As is well known, the magnitude of the maximum capacitance of a device of the oxide type is dependent upon the area of the extended electrode and the spacing between that electrode and the adjacent surface of the semiconductor body—the greater the area, and the less the spacing, the greater is the maximum capacitance. The magnitude of the capacitance can be varied over an appreciable range by varying the DC potential difference applied to the extended area electrode and the semiconductor body. The degree to which the capacitance can be varied in such a device has, however, been limited. For example, in a typical silicon semiconductor varactor embodied in an integrated circuit, variation in control bias has been effective to cause the capacitance to vary between an upper limit of 30 picofarads and a lower limit of 10 picofarads, representing a capacitance range of 3:1.

It is the prime object of the present invention to devise an oxide-type varactor structure in which the range of variation in capacitance can be greatly increased over what was formerly thought to be possible, and by means readily adaptable to microcircuit and integrated circuit applications.

I have found that if one or more portions are formed in the semiconductor body which are of opposite conductivity type from that of the main body, which portions open onto the surface which faces the extended area electrode, and if those portions are electrically connected to the extended area electrode, the desired extension of the range of variation of capacitance is achieved. The surface areas of these sections of opposite conductivity type are very small compared to the electrode area, thereby to minimize the loss of maximum capacitance produced by such areas. Preferably they are no greater than $1/10$ the area of said electrode, and they may be $1/100$ of that area or even less.

It is noteworthy that the practice of the present invention does not significantly adversely affect the speed of response of the varactor. The only significant limitation in the mode of use of the varactor of the present invention, when compared with conventional oxide-type varactors, is that in the varactor of the present invention the varactor electrodes can only be biased in such a sense as to reverse-bias the junction which is formed between the main semiconductor body and the portion of opposite conductivity type formed therein.

The structure of the present invention is eminently suited for microcircuit and integrated circuit applications, and the methods by which that structure may be fabricated are of the same type as are conventionally employed in the manufacture of such microcircuit and integrated circuit assemblies.

Through the practice of the present invention capacitance variation over a range of 15:1 is achievable, this being an improvement over comparable prior art devices by a factor of five. The capacitance decreases from its maximum value as the bias applied to the device is increased, up until a point when breakdown occurs at the junction between the semiconductor portions of opposite conductivity type. This junction breakdown voltage is usually less than the breakdown voltage through the dielectric layer, thus providing an inherent over-voltage protection characteristic, since junction breakdown is nondestructive and reversible, while dielectric layer breakdown is degrading and irreversible.

Figure 2:
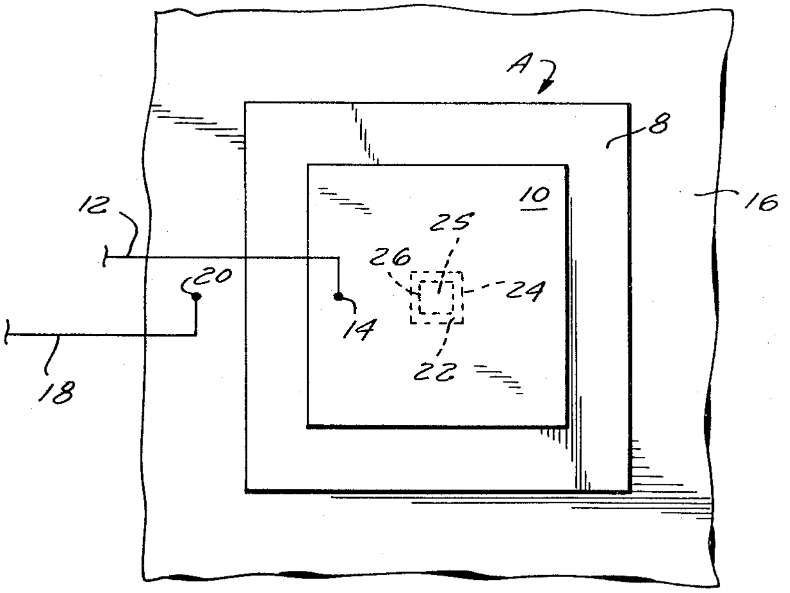

To the accomplishment of the above, and to such other objects as may hereinafter appear, the present invention relates to the construction of an oxide-type varactor having an extended range of capacitance variation, as defined in the appended claims and as described in this specification, taken together with the accompanying drawings, in which:

FIG. 1 is a schematic cross sectional view, greatly enlarged and not to scale, showing an exemplary embodiment of the present invention; and FIG. 2 is a top plan view of the embodiment of FIG. 1.

While the invention is here specifically disclosed as embodied in a varactor comprising a predominantly N-type silicon semiconductor on which a silicon dioxide insulating layer is formed, this is by way of exemplification only, and it should be understood that different materials and different conductivity types could be employed within the scope of the present invention. It should further be borne in mind that the drawings are not to scale, nor do they necessarily show the various parts in their proper or desired proportions.

The specific embodiment of the present invention here illustrated comprises a semiconductor body generally designated A, which may be formed of N-type silicon, and which, in accordance with well known techniques, may consist of a first N-type section 2 onto which a second section 4, also N-type, is epitaxially grown, thereby to minimize the series resistance of the device. The body A has an upper surface 6 on which a dielectric layer 8 is formed in any appropriate manner. Usually, when the body A is formed of silicon as shown, the layer 8 will be formed of silicon dioxide. The thickness of the layer 8 should be minimized in order to increase the effective capacitance of the finished device, and to that end a thickness of 700–1000 angstroms is effective. On top of the dielectric layer 8 is an electrode 10 of appreciable. area, formed from any appropriate conductive material.

Electrical connections are made to the electrode 10 and to the body A in any appropriate manner. As here specifically disclosed electrical connection to the electrode 10 is made by lead 12 which is bonded thereto in any appropriate fashion at 14. The conductive body A is shown as mounted on a conductive base 16 to which lead 18 is bonded in any appropriate fashion at 20, the lead 18 thus being electrically connected to the body A via the conductive base 16. The lead 18 and conductive base 16 here function as an electrode electrically connected to the semiconductor body A.

The structure as thus far described is that of a conventional oxide-type varactor. A capacitance is defined between the electrode 10 and the semiconductor body A, and more specifically with that portion of the semiconductor body A near the surface 6. When an external bias voltage is applied between the leads 12 and 18 the magnitude of that capacitance will vary. In general a maximum capacitance, determined by the area of the electrode 10 and the thickness of the layer 8, will be exhibited with large values of DC bias in either direction, capacity variation occurring as the bias is varied over an intermediate range. It has been found that in such devices a lower limit of capacitance is reached at certain maximum bias values, after which an increase in the bias results in no further decrease in capacitance.

In accordance with the present invention I provide, in the semiconductor body A, a portion 22 of opposite conductivity type which extends to the surface 6. As here disclosed, when the body A is predominantly of N-type, the portion 22 is of P-type. The portion 22 may be formed in any appropriate manner, as by causing a P-type impurity to diffuse into the body A at the surface 6 over the desired surface area thereof. The techniques for accomplishing this are well known. As a result a P–N junction 24 is formed between the P section 22 and the remainder of the body A, which is of N-type.

The electrode 10 is electrically connected to the P-type portion 22, as indicated at 24 in the drawings, so that the P-type section 22 will be biased similarly to the electrode 10, and hence differently from the body A. The direction of bias is such as to reverse-bias the rectifying junction 24.

As a result of providing the P-type portion 22 and the electrical connection 24 thereto from the electrode 10, the restriction on the lower limit of capacitance characteristic of prior art structures is avoided, and the capacitance of the device continues to decrease as the bias is increased, up to a point where breakdown across the junction 24 occurs. By means of this teaching a varactor which formerly exhibited a maximum capacitance of 30 picofarads and a minimum capacitance of 10 picofarads is converted into a device having a maximum capacitance of 30 picofarads and a minimum capacitance of 2 picofarads.

Since the capacitance in a device of the type under discussion is created between the electrode 10 and those portions of the semiconductor body A separated therefrom by the dielectric layer 8, it will be seen that providing the P-type portion 22 tends to reduce the effective capacitance-producing area of the electrode 10 by the amount of the surface area of the P-type portion 22.

However, the surface area of the P-type portion 22 can be made sufficiently small in relation to the area of the electrode 10 so as to have no appreciable effect on the maximum capacitance attainable, while at the same time functioning effectively to produce the desired marked reduction in minimum capacitance. While the relative surface areas of the P-type portion 22 and the electrode 10 are not highly critical, best results are obtained when the surface area of the portion 22 is no more than about $1/10$ the area of the electrode 10, and preferably is about $1/100$ of the electrode area 10. More specifically, the active surface of the electrode 10 might have a diameter of 3–10 mils while the surface area of the portion 22 might have a diameter of 1 mil.

The construction of the present invention may be fabricated very simply and effectively. For example, the silicon dioxide layer 8 may be formed over the entire surface 6, after which a window 26 may be etched therein by standard photolithographic techniques. A P-type impurity is diffused into the body A through the window 26, thereby to form the P-type section 22. Thereafter the thick oxide layer 8 is removed, a new oxide layer 8 of thinness appropriate to varactor action is grown, a new window 26 is etched therein, and, through the new window 26, the electrode 10 is formed integrally with the portion 24 which connects it with the P-type portion 22.

The ability of the device to exhibit wide capacitance variation with variation in DC bias will exist provided that the transit time for holes to the P-type portion 22 from the furthest point in the body A near the surface 6 which is under the electrode 10 is not substantially greater than the minority carrier lifetime at the surface 6. This condition is fulfilled with an appreciable factor of safety, for example, when the electrode 10 has a 10-mil diameter and the P-type portion 22 has a 1-mil diameter. However, the relationship set for is only approximate, and in any event does not embody a limitation on the maximum area of the electrode 10; if wider electrodes 10 are employed, desired capacitance variation can be obtained by providing a plurality of appropriately spaced P-type portions 22.

With the device of the present invention, as the reverse bias applied at the leads 12 and 18 continues to increase, the effective capacitance between the electrode 10 and the semiconductor body A will decrease until diode breakdown occurs. This characteristic differs from that of prior art oxide-type varactors in two respects. First, with the present device capacitance varies in the opposite sense to bias, whereas with the prior art devices capacitance varied in the same sense as the absolute magnitude of the bias to either side of an intermediate value. Second, in the present device capacitance variation continues all the way to breakdown, whereas in the prior art devices capacitance variation stopped well before breakdown.

The breakdown voltage of the junction 24, in devices of the present invention, will usually be less than the breakdown voltage of the dielectric layer 8. This produces an inherent overvoltage protection characteristic. Junction breakdown is not destructive, and even if it occurs the device will not be damaged. However, should the dielectric layer 8 break down the utility of the device would be destroyed.

Thus it will be apparent that by a modification which is simple both structurally and from the point of view of fabrication, and which is readily capable of being incorporated into microcircuit and integrated circuit aplications, varactor structures have been produced in which the range of capacitance variation is very greatly increased over what has previously been available, and which have an inherent protection against damage from overvoltages.

While but a single embodiment of the present invention has been here specifically disclosed, it will be apparent that many varations may be made therein, all within the scope of the instant invention as defined in the following claims.

I claim:

1. In an oxide-type varactor comprising a semiconductor body having a surface, said body comprising a main portion of first conductivity type extending to said surface over a first area, a dielectric layer directly on said surface at least over a substantial portion of said first area, a first electrode of appreciable area on said dielectric layer and extending over said first area to a substantial extent, and a second electrode electrically connected to said main body portion, the area of said first electrode which overlies said first area, the doping of said main portion, and the thickness of said dielectric layer all being appropriate to varactor action, said thickness being no more than about 1000 A., whereby the capacitance between said first electrode and said main body portion is appreciably controllably variable with changes in the bias applied between said electrodes; the improvement which comprises a second body portion of second conductivity type in said body, extending to said surface over a second area beneath said first electrode, and forming a junction between itself and said main body portion, said second area being a minor proportion, not more than 10%, of the area of said first electrode and means electrically connecting said first electrode and said second body portion, whereby the range of capacitance variation with changes in the bias applied between said electrodes is increased as compared with the range of capacitance variation existing in the absence of said second body portion and said means electrically connecting said first electrode and said second body portion.

2. In the varactor of claim 1, biasing means electrically connected to said first and second electrodes and effective to provide a reverse bias for said junction.

3. The varactor of claim 1, in which said second area is located beneath said dielectric layer and said first electrode, and in which said electrical connection between said first electrode and said second portion passes through said dielectric layer.

4. The varactor of claim 3, in which said second area is most substantially $\frac{1}{10}$ of the area of said first electrode.

5. The varactor of claim 3, in which said second area is substantially on the order of $\frac{1}{100}$ of the area of said first electrode.

6. The varactor of claim 2, in which said second area is located beneath said dielectric layer and said first electrode, and in which said electrical connection between said first electrode and said second portion passes through said dielectric layer.

7. The varactor of claim 2, in which said second area is at most substantially $\frac{1}{10}$ of the area of said first electrode.

8. The varactor of claim 2, in which said given area is substantially on the order of $\frac{1}{100}$ of the area of said first electrode.

9. The varactor of claim 2, in which said second area is located beneath said dielectric layer and said first electrode, said electrical connection between said first electrode and said second portion passes through said dielectric layer, and said second area is at most substantially $\frac{1}{10}$ of the area of said first electrode.

10. The varactor of claim 2, in which said second area is located beneath said dielectric layer and said first electrode, said electrical connection between said first electrode and said second portion passes through said dielectric layer, and said second area is substantially on the order of $\frac{1}{100}$ of the area of said first electrode.

References Cited

UNITED STATES PATENTS

| | | | |
|---|---|---|---|
| 3,391,346 | 7/1968 | Uhlir | 330—4.9 |
| 3,328,210 | 6/1967 | McCaldin | 148—1.5 |
| 3,271,201 | 9/1966 | Pomerantz | 148—33.3 |
| 3,065,391 | 11/1962 | Hall | 317—234 |
| 3,287,612 | 11/1966 | Lepselter | 317—235 |
| 3,271,685 | 9/1966 | Husher | 325—440 |

FOREIGN PATENTS

| | | |
|---|---|---|
| 1,361,215 | 4/1964 | France. |
| 998,388 | 7/1965 | Great Britain. |

JOHN W. HUCKERT, Primary Examiner

M. EDLOW, Assistant Examiner

U.S. Cl. X.R.

317—235, 242

UNITED STATES PATENT OFFICE
CERTIFICATE OF CORRECTION

Patent No. 3,508,123 April 21, 1970

Barry J. Liles

It is certified that error appears in the above identified patent and that said Letters Patent are hereby corrected as shown below:

In the heading to the printed specification, line 6, "of New Jersey" should read -- of Delaware --.

Signed and sealed this 22nd day of December 1970.

(SEAL)
Attest:

Edward M. Fletcher, Jr.
Attesting Officer

WILLIAM E. SCHUYLER, JR.
Commissioner of Patents